Aug. 2, 1960  G. W. WRIGHT ET AL  2,947,259
MOTOR-PUMP UNIT FOR AUTOMOTIVE FUEL
Filed Dec. 6, 1957  3 Sheets-Sheet 1
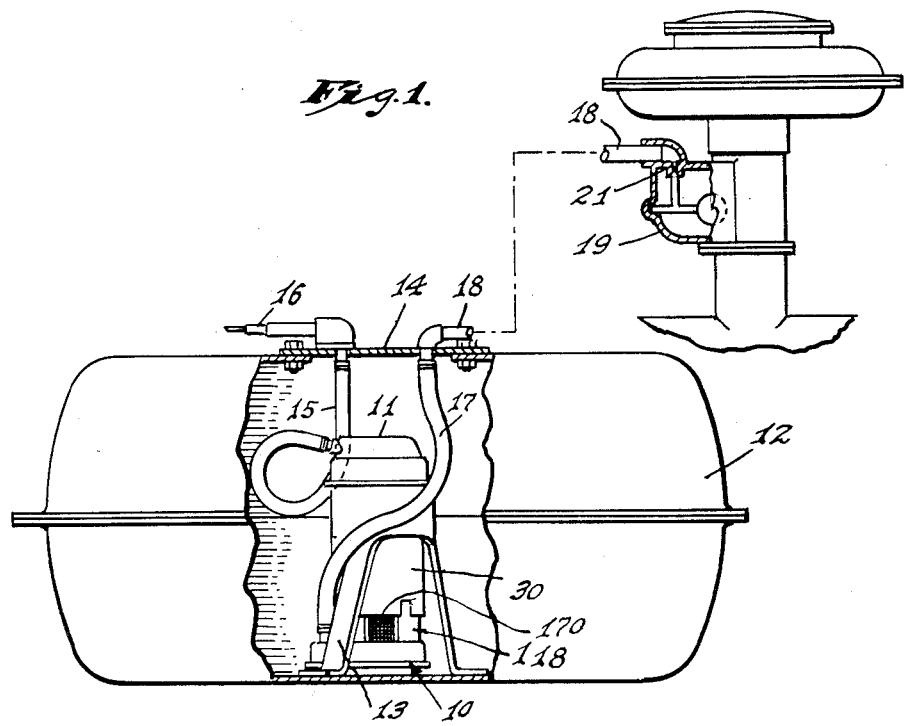
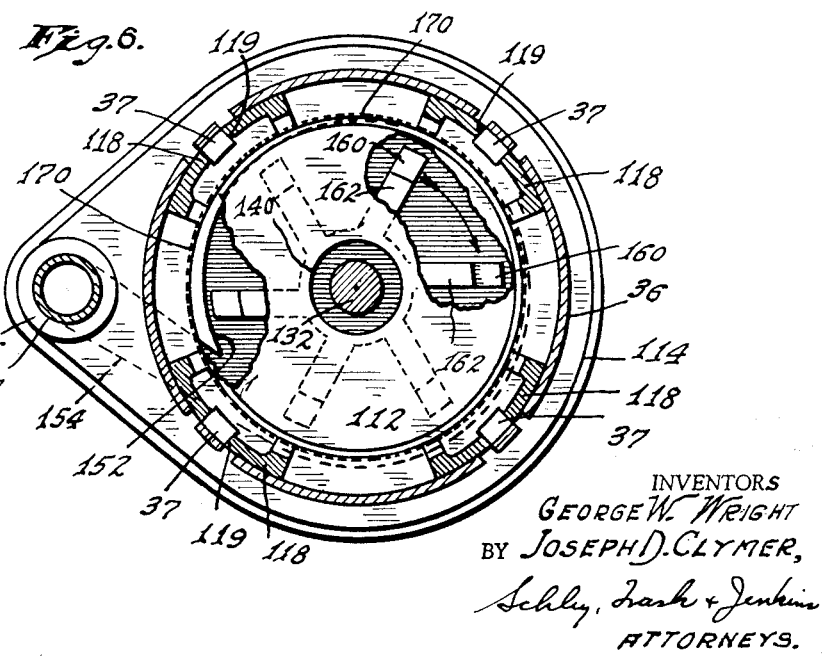
INVENTORS
GEORGE W. WRIGHT
BY JOSEPH D. CLYMER,
ATTORNEYS.

Aug. 2, 1960  G. W. WRIGHT ET AL  2,947,259
MOTOR-PUMP UNIT FOR AUTOMOTIVE FUEL
Filed Dec. 6, 1957  3 Sheets-Sheet 2
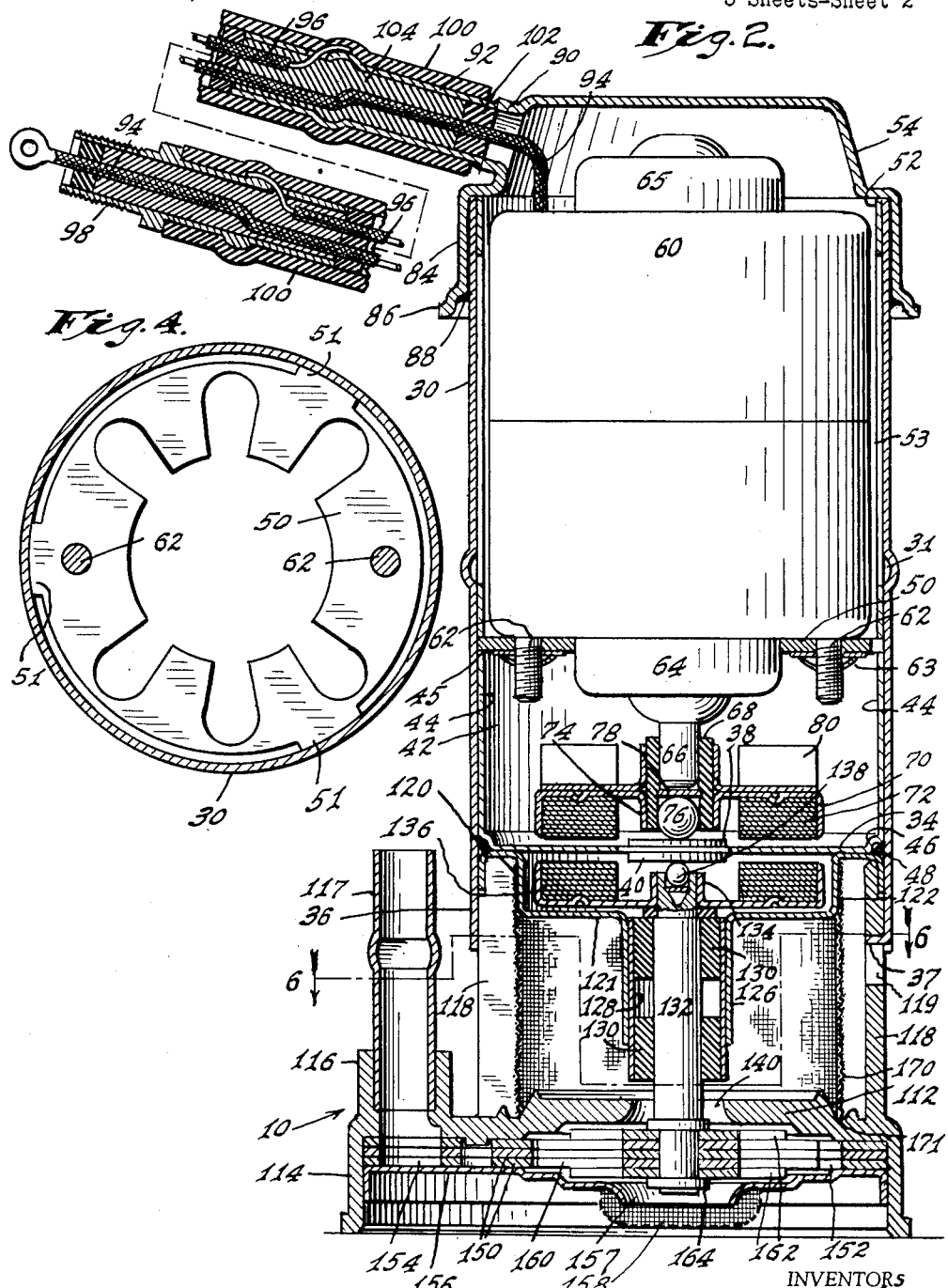
INVENTORS
GEORGE W. WRIGHT
BY JOSEPH D. CLYMER,
ATTORNEYS.

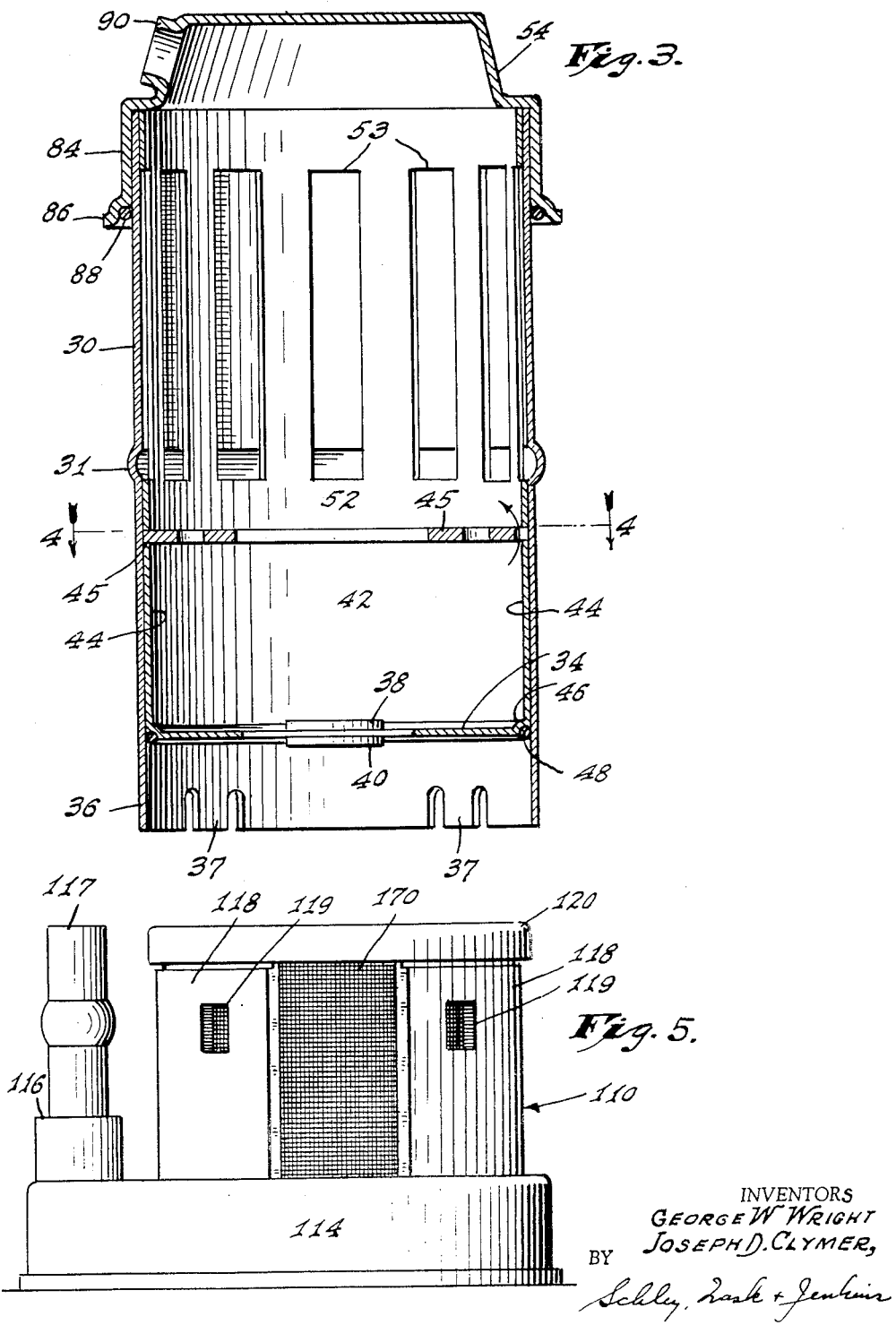

United States Patent Office 2,947,259
Patented Aug. 2, 1960

2,947,259

MOTOR-PUMP UNIT FOR AUTOMOTIVE FUEL

George W. Wright, Yoder, and Joseph D. Clymer, Fort Wayne, Ind., assignors to Tokheim Corporation, Fort Wayne, Ind., a corporation of Indiana Filed Dec. 6, 1957, Ser. No. 701,047

11 Claims. (Cl. 103—87)

This invention relates to a submersible motor-pump unit adapted to operate submerged in a liquid, such as gasoline or other combustible fuel, especially for pumping such fuel from the fuel tank to the internal combustion engine of an automotive vehicle.

The motor-pump unit is of the general type disclosed in the co-pending application of William L. Hudson, Serial No. 538,753, filed October 5, 1955, now Patent No. 2,885,126, which has a drive assembly including a motor and a magnetic-coupling driving member enclosed in a housing and has a pump open to the liquid in which the unit is submerged and connected to a magnetic-coupling driven member coupled to the driving member through an imperforate diaphragm wall of the drive assembly housing.

It is the general object of the invention to provide an improved motor-pump unit of this type, and especially to provide a unit which is adapted to facilitate commercial production and use.

In accordance with one aspect of the invention, the drive assembly housing comprises a tube in which the imperforate diaphragm wall is formed as an end wall, as by the web of a cup sealedly fixed in the tube and whose sides form shoulder means in the tube in predetermined positional relation with the diaphragm wall. A motor mount is centered in the tube and accurately positioned therein with respect to the diaphragm, preferably by such shoulder means, and the motor mount is held in place by a retainer acting between such mount and a closure for the housing tube. The arrangement accurately locates the motor and especially the magnetic-coupling driving member in predetermined operating relation with the diaphragm wall. The said closure is sealingly fixed in place to seal the housing and secure the enclosed parts in such predetermined positions. The motor may be held spaced from the tube and air circulated around and through it by fan blades on the coupling member. The enclosed drive assembly is desirably manufactured as a self-contained unit, with its housing tube projecting beyond the diaphragm wall to receive and guide a driven assembly in proper operational relation with the driving assembly, and is adapted to be combined with different pump assemblies to serve different needs.

In accordance with another aspect of the invention, the driven assembly comprises a bearing support adapted to be received and guided in the projecting skirt of the housing tube and to be seated against the diaphragm wall therein, and bearings carried thereby to support a shaft and the magnetic-coupling driven member in accurately located operating relationship with the diaphragm wall and the driving assembly enclosed thereby. The shaft carries a pump rotor, and a pump housing is accurately positioned with respect thereto by cooperative guided relationship with the bearing support and the housing tube projection or skirt. The driven assembly, or pump assembly, is desirably manufactured as a substantially self-contained unit, which is held in place by mechanical connection with the housing tube, as by deforming tongues on the tube into locking engagement with notches in the pump housing, and such connection desirably also serves to secure parts of the pump assembly together, for example, to secure the pump body to the bearing support. Tractive thrust between the magnetic-coupling members is desirably sustained by thrust bearing means between the diaphragm wall and the respective driving and driven rotors. The diaphragm wall coacts as a stop both with the moving and the fixed parts of the two assemblies to accurately locate the same with respect to itself and hence with respect to each other.

The self-contained motor units and pump assemblies are desirably combined in matched relationship to give controlled output characteristics, as more fully set forth in co-pending application Serial No. 685,013, filed September 19, 1957.

Other novel and inventive features and inter-relationships will appear from the following description of a preferred modification illustrating the invention.

The accompanying drawings illustrate the invention. In such drawings:

Fig. 1 is a diagrammatic view showing a motor-pump unit embodying the invention and mounted in an automotive fuel tank and connected to the engine carburetor;

Fig. 2 is an axial section of the motor-pump unit shown in Fig. 1;

Fig. 3 is a section similar to Fig. 2, showing the drive assembly housing and motor-mount, with the motor and the magnetic-coupling member omitted;

Fig. 4 is a section taken on the line 4—4 of Fig. 3;

Fig. 5 is a side elevation of a pump sub-assembly, positioned in exploded relationship with the motor unit housing of Fig. 3; and Fig. 6 is a horizontal section taken on the line 6—6 of Fig. 2.

The motor and pump unit shown in Fig. 1 comprises a pump 10 assembled to a sealed motor assembly 11 to form a motor-pump unit. The unit 10—11 is mounted by a bracket 13 on the bottom of an automotive fuel tank 12 beneath an opening closed by a cover plate 14. An electrical supply line 16 for the motor-pump unit is connected through a fitting on the plate 14 and through a sealed flexible conduit 15 to the motor 11. A flexible delivery hose 17 connects the discharge of the pump 10 to an outlet fitting in the cover plate 14 and to a delivery line 18 leading to the fuel mixing device of the automotive engine, such as a carburetor 19 having a float controlled inlet valve 21.

The motor-pump unit shown in Figs. 2 to 6 comprises a cylindrical housing tube 30 which is desirably of accurately-sized inner diameter and which may be formed with a bead 31 intermediate its ends for cooperation with a mounting. An imperforate end wall 34 is positioned and sealed in the lower end of the tube 30, at a position spaced upward from the end of the tube. This leaves a downward-projecting skirt 36 below it, and such skirt is provided with pairs of slots which form depending tongues 37 at four spaced points about its edge. The imperforate end wall 34 desirably carries central hardened wear plates 38 and 40 on its opposite faces, for purposes which will be described below.

In the structure shown, the imperforate end wall 34 is the bottom wall or web of a sheet-metal cup 42, desirably of non-magnetic stainless steel, having sides 44 which slidably fit within the tube 30 and which accurately position the end wall 34 at right angles to the axis of the tube 30. The cup 42 is desirably provided with an inwardly displaced corner bead 46 which forms between itself and the wall of the tube 30 a groove for the reception of a ring 48 of soldering or brazing material which when heated, as by electrical induction, melts and sealingly joins the sides 44 of the cup to the tube 30.

The imperforate end wall 34 fixed in the tube 30 is used as a reference base for accurately positioning the operating parts. The sides 44 of the cup 42 are made of accurate height so that their upper edge provides a shoulder 45 in the tube 30 which is accurately positioned with respect to the end wall 34. This receives and locates a motor-mount, and thereby locates the motor and the magnetic-coupling driving member. As is shown in Fig. 3, where the motor is omitted for clarity, the motor-mount is a plate 50 which is centered in the tube 30 by three circumferentially spaced projections 51, and is positioned by and against the shoulder 45 at the edge of the cup 42, where it is retained by a hold-down spacer or sleeve 52 standing between the upper face of the motor-mounting plate 50 and the inner face of a cap 54 which closes the upper end of the motor housing.

An electric motor 60 is mounted on the mounting plate 50 and is wholly supported and positioned thereby in accurate location with respect to the diaphragm wall 34. The motor 60 is conveniently a self-contained unit having its own motor case and provided with mounting bolts 62 which extend through apertures in the plate 50 and are secured therein by nuts 63. The motor includes a motor shaft 66 mounted in bearings (not shown) in bearing bosses 64 and 65 at the ends of the motor case. The motor is mounted on the plate 50 with its shaft axis centered in and normal to the mounting plate. When the plate is then centered in the tube 30 against the shoulder 45, the motor is supported by its mounting bolts 62 without straining or disturbing the assembled relationship of its parts, and the motor shaft will be on an axis normal to the imperforate end wall 34 and substantially co-axial with the housing tube 30.

The lower end of the shaft 66 carries the driving member of the magnetic-coupling. This comprises a carrier 70 containing a driving magnet 72 and mounted on a hub 68 fixed on the shaft 66. The magnet is an annular magnet having a plurality of poles on its bottom end face, and is held within a circumferential wall on the carrier by bending the lower portion of such wall inward against a chamfer on the magnet. The hub 68 of the coupling driving member forms a downwardly open socket 74 which contains a hardened thrust plate 78 and encloses a bearing ball 76 which forms a thrust bearing between the wear plate 38 on the imperforate wall 34 and the rotating parts of the driving assembly.

Desirably, the coupling driving member carries a series of fan blades 80 on its upper surface, to circulate through and about the motor the air or other gas contained within the sealed motor housing. For such circulation, the edge portions of the mounting plate 50 between the projections 51 are spaced inward from the housing tube to pass gas upward about the motor, and the web of the plate 50 is provided with a pattern of openings, such as shown in Fig. 4, registering with openings in the motor case. Also, the motor-mount retainer sleeve 52 is provided with a series of elongated apertures 53, to permit direct contact of the circulating gas both with the inner surface of the housing tube 30 and with the outer surface of the casing of the motor 60. The gas thus flows downward through the motor 60 to the fan 80, and thence upward around the motor casing and in direct heat-transfer relation with the housing tube 30.

The upper end of the motor housing is closed by the cap 54, which also secures the retainer 52 in place against the motor-mount. The cap 54 has an outer depending flange 84 which slidably fits over the upper end of the housing tube 30 and which at its lower edge is desirably provided with an outwardly displaced bead 86, forming between itself and the tube 30 a groove for the reception of a ring 88 of solder or brazing compound. This is melted, as by conductive heating, to sealingly join the cap 54 to the housing tube 30 in a final step of assembling and closing the driving assembly unit.

The enclosed motor 60 is connected to an electrical source through a sealed connection. As shown, the cap 54 is formed at one side to provide a collar 90 to which is welded a nipple 92 through which the live supply wire 94 for the motor 60 is passed. The wire 94 extends from the nipple 92 to a connector 98, and is enclosed therebetween by a flexible tube 100 sealed to the nipple and the connector. The nipple 92 is completely sealed about the wire 94 by a grommet 102 and by sealing compound 104. Conveniently, a single wire arrangement is used, with the opposite side of the electrical circuit grounded to the motor casing and through it to the housing 30—54. To ensure grounding of such housing, a ground wire 96 is connected between the outer end of the nipple 92 and the inner end of the connector 98 and is enclosed with the live wire 94 in the tube 100; which requires that the single wire 94 alone needs to pass through the sealed nipple 92.

The structure described above forms a completely sealed and enclosed motor unit whose walls are imperforate and through which no shaft extends to require any rotary seal. The enclosed and sealed housing may be provided with a controlled atmosphere to enhance the operation and prolong the life of the motor 60. The driving member 70 of the magnetic-coupling is operatively carried by the motor shaft 66 in torque-transmitting relationship with the non-magnetic imperforate wall 34, in accurately aligned and spaced relationship to that imperforate wall and to the portion of the housing tube 30 which projects downward beyond such wall to form the mounting skirt 36.

The pump or driven assembly shown in Figs. 2 and 5 is of the type shown in our co-pending application Serial No. 685,013, filed September 19, 1957. It comprises a main pump body casting 110 which forms the top or upper end wall 112, a depending outer wall or skirt 114, an outlet boss 116, and four angularly spaced posts 118. The upper ends of the four posts 118 are received in the downwardly open peripheral channel section 120 of a sheet-metal bearing support member 122. The inner wall of such channel section is joined to a radial wall 121, and such two walls form a housing for the driven magnet. The inner edge of the wall 121 carries a central depending collar 126 into which is pressed a bearing sleeve 128 containing a pair of spaced bearings 130. In the assembled motor-pump unit, the outer faces of the channel 120 center the bearing support member 122 in the tube and the upper faces thereof seat against the diaphragm wall as a stop, and the bearing support is thereby guided and accurately positioned in operative relation with the driving assembly. The inner surfaces of the channel 120 receive and position the upper ends of the posts 118 and accurately position the pump body casting 110. Each post 118 contains an opening 119 into which a tongue 37 of the motor-housing skirt 36 may be bent, which will secure the pump casting against the bearing support and will secure both to the driving assembly.

A pump shaft 132 is journalled in the bearings 130 and has fixed to its upper end a carrier 134 containing an annular magnet 136 and forming the driven member of the magnetic-coupling. The upper end of the shaft 132 carries a thrust-bearing ball 138 which in the assembled motor-pump bears against the thrust plate 40 carried by the bottom face of the imperforate diaphragm wall 34 of the motor unit. This takes the tractive force of the magnet, and in cooperation therewith positions the pump rotor assembly axially with respect to the wall 34 and hence with respect to the bearing support 122 and pump body casting 110.

The lower end of the pump shaft 132 passes through an inlet eye 140 in the top wall 112 of the pump body, and is provided with a collar substantially at the level of the inner face of the pump body wall 112. A stack of spider-shaped laminations 160 and 162 are pressed on the lower end of the shaft 132 anad held in place by a collar 164, to form an impeller for the pump.

The pump body walls 112 and 114 form a downwardly-open cavity about the impeller, with a cross-sectional shape of the configuration indicated in Fig. 6. The cavity receives a stack of sheet-metal pumping-chamber laminations 150, three being shown in Fig. 2, which have central punched pump-chamber openings 152. Such openings are of the shape desired for the cross-section of the pump chamber, and may include an impeller sweep-space, a volute of progressively increasing width about the sweep-space, and a tangential discharge passage 154 leading to the outlet passage through the outlet boss 116 of the pump body casting. Such outlet boss is fitted with a nipple 117 for connection to the discharge tube 17 shown in Fig. 1. The bottom wall of the pumping chamber is provided by a sheet-metal cover 156 inserted within the peripheral wall 114 against the stack of laminations and secured in place, as by staking. The bottom wall contains a bottom inlet eye 157, protected by a hat-shaped screen 158 secured at its edges against the bottom face of the stamping 156.

The assembled impeller 160—162 is desirably of a non-vapor-locking type in accordance with the teachings of co-pending application Serial No. 514,221. To this end, it has a solid central hub of approximately the same diameter as the top and bottom eyes 140 and 157 of the pump, with impeller blades 160 extending radially therefrom in openly spaced relation in the pumping chamber. The top eye 140 of the pump is open to the surrounding body of liquid by way of the spaces between the posts 118, and is protected by a cylindrical screen 170 positioned at the bottom in a groove 171 in the pump body wall 112, and positioned at the top by the inner wall of the bearing support channel 120.

In the pump assembly described above, the radial bearings 130 are held co-axial with the outer surface of the channel 120 and are positioned axially in predetermined relation to the upper surface of the channel 120. Similarly, the alignment and spacing of the pump body is fixed by engagement of the posts 118 in such channel 120. When the pump assembly and the motor unit are brought together, the upper end of the pump assembly is snugly received in the projecting skirt 36 of the drive housing tube 30, and is pressed tightly against the imperforate end wall 34. This brings the elements of the pump assembly into predetermined relation with the same reference elements, that is, the imperforate wall 34 and the outer tube 30, with respect to which the motor assembly elements are positioned. The magnetic traction between the driving and driven magnets 72 and 136 draw the coupled rotor assemblies together against the thrust bearings formed by the balls 76 and 138, to accurately space the coupled members from each other and to locate both with respect to the imperforate wall 34 and to the stationary parts of the driving and driven assemblies. Thus, in the pump assembly, this axial positioning locates the pump impeller 160—162 in proper clearance relation with the pump body 112—156. The pump assembly and the motor unit are held in assembled relation by bending the tongues 37 of the motor-housing skirt 36 into the openings 119 in the posts 118 of the pump casting.

The construction shown and described above is advantageously adapted for commercial production, especially in that it permits the driving and driven assemblies to be manufactured separately, and to be assembled selectively in various desired relationships. For example, the same driving assembly may be assembled with different pump assemblies, or with pump assemblies having different numbers of laminations as disclosed in co-pending application Serial No. 685,013. In any such case, the construction described provides accurate positioning of parts in predetermined operating relationship, and does so in a manner which facilitates commercial production of motor-pump units of uniform output characteristics.

We claim as our invention:

1. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a housing tube, a cup-shaped member sealingly fixed in said tube with its web forming the imperforate diaphragm wall as a transverse end wall for said housing tube and with its sides forming shoulder means in predetermined positional relation with said diaphragm wall, a motor mount centered in said tube engaging and positioned by said shoulder means in predetermined relation to said diaphragm wall, said motor being mounted on said mount and thereby positioned with its axis normal to said diaphragm wall and said magnetic-coupling member being thereby positioned by the motor shaft for rotation on an axis normal to said wall in magnetic field-transmitting relation therewith, a hold-down spacer engaging said motor mount to retain the same in mounted position against said shoulder means, a closure for the end of said housing tube in which said motor is mounted, said closure engaging said hold-down spacer to retain the same against said mount and being sealingly fixed to said housing tube to close the same whereby the drive assembly is sealingly enclosed by and fixed in said housing means, said tube extending beyond said diaphragm wall and forming a projecting skirt, a bearing support for said driven assembly received and guided in said projecting skirt and coacting with said diaphragm as a stop, said support supporting shaft-bearing means with a shaft rotatable therein and supporting the magnetic-coupling driven member for rotation on an axis normal to said wall and substantially co-axial with the axis of rotation of said magnetic-coupling driving member, a pump rotor carried by said shaft, a pump body positioned from said bearing support and forming a pump chamber about said pump rotor, and inlet and outlet means for the pump.

2. A submersible motor driven unit having a drive assembly including a motor and a magnetic-coupling driving member operatively connected to the motor shaft thereof, and having a driven assembly including a magnetic-coupling driven member and driven element connected thereto, said coupling members being magnetically coupled through an imperforate diaphragm wall, said unit comprising a housing tube, a cup-shaped member sealingly fixed in said tube with the web forming the imperforate diaphragm wall as a transverse end wall for said housing tube and with its sides forming shoulder means in predetermined positional relation with said diaphragm wall, a motor mount centered in said tube engaging and positioned by said shoulder means in predetermined relation to said diaphragm wall, said motor being mounted on said mount and thereby positioned with its axis normal to said diaphragm wall and said magnetic-coupling member being thereby positioned by the motor shaft for rotation on an axis normal to said wall in magnetic field-transmitting relation therewith, a hold-down spacer engaging said motor mount to retain the same in mounted position against said shoulder means, a closure for the end of said housing tube, said closure engaging said hold-down spacer to retain the same against said mount and being sealingly fixed to said housing tube to close the same whereby the drive assembly is sealingly enclosed by and fixed in said housing means, said tube extending beyond said diaphragm wall and forming a projecting skirt, said driven assembly having means received and guided in said skirt and coacting with said diaphragm wall as a stop for positioning the driven assembly in operating relation with said driving assembly.

3. A submersible motor driven unit having a drive assembly including a motor and a magnetic-coupling driving member operatively connected to the motor shaft thereof, and having a driven assembly including a magnetic-coupling driven member and driven element connected thereto, said coupling members being magnetically coupled through an imperforate diaphragm wall, said unit comprising a housing tube, a cup-shaped member sealingly fixed in said tube with its web forming the imperforate diaphragm wall as a transverse end wall for said housing tube and with its sides forming shoulder means in predetermined positional relation with said diaphragm wall, a motor mount centered in said tube engaging and positioned by said shoulder means in predetermined relation to said diaphragm wall, said motor being mounted on said mount and thereby positioned with its axis normal to said diaphragm wall and said magnetic-coupling member being thereby positioned by the motor shaft for rotation on an axis normal to said wall in magnetic field-transmitting relation therewith, a holddown spacer engaging said motor mount to retain the same in mounted position against said shoulder means, a closure for the end of said housing tube, said closure engaging said hold-down spacer to retain the same against said mount and being sealingly fixed to said housing tube to close the same whereby the drive assembly is sealingly enclosed by and fixed in said housing means, said driven assembly having means coacting with said tube as a guide and with said diaphragm wall as a stop for positioning the driven assembly and the magnetic-coupling driven member in co-axial operative relation with the driving assembly and magnetic-coupling driving member.

4. A submersible motor driven unit having a drive assembly including a motor and a magnetic-coupling driving member operatively connected to the motor shaft thereof, and having a driven assembly including a magnetic-coupling driven member and driven element connected thereto, said coupling members being magnetically coupled through an imperforate diaphragm wall, said unit comprising a housing tube, a cup-shaped member sealingly fixed in said tube with its web forming the imperforate diaphragm wall as a transverse end wall for said housing tube and with its sides forming shoulder means in predetermined positional relation with said diaphragm wall, a motor mount centered in said tube engaging and positioned by said shoulder means in predetermined relation to said diaphragm wall, said motor being mounted on said mount and thereby positioned with its axis normal to said diaphragm wall and said magnetic-coupling member being thereby positioned by the motor shaft for rotation on an axis normal to said wall in magnetic field-transmitting relation therewith, a holddown spacer engaging said motor mount to retain the same in mounted position against said shoulder means, a closure for the end of said housing tube, said closure engaging said hold-down spacer to retain the same against said mount and being sealingly fixed to said housing tube to close the same whereby the drive assembly is sealingly enclosed by and fixed in said housing means, said driven assembly having means coacting with said tube as a guide and aligning the driven assembly and the magnetic-coupling driven member in co-axial operative relation with the driving assembly and magnetic-coupling driving member.

5. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a housing tube having the imperforate diaphragm wall as a transverse end wall therein, said motor being mounted in said tube with its shaft supporting said magnetic-coupling driving member for rotation in said tube on an axis normal to said diaphragm wall and in magnetic field-transmitting relation therewith, and a closure for the end of said housing tube in which said motor is mounted, whereby the drive assembly is sealingly enclosed by said housing means, said tube extending beyond said diaphragm wall and forming a projecting skirt, a bearing support received and guided in said skirt and having bearing means supporting a shaft for rotation on an axis substantially co-axial with said motor shaft, the coupling driven member being fixed on said shaft for rotation in field coupled relation with said driving member to drive the shaft, a pump rotor on the shaft beyond said bearing means, a pump casing positioned from said bearing support and forming a pump chamber about said pump rotor, and inlet and outlet means for the pump.

6. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a housing tube having the imperforate diaphragm wall as a transverse end wall therein, said motor being mounted in said tube with its shaft supporting said magnetic-coupling driving member for rotation in said tube on an axis normal to said diaphragm wall and in magnetic field-transmitting relation therewith, and a closure for the end of said housing tube in which said motor is mounted, whereby the drive assembly is sealingly enclosed by said housing means, said housing tube extending beyond said diaphragm wall and forming a projecting skirt, a bearing support having an outer annular portion and an inwardly extending wall joined thereto forming an upwardly open cavity, shaft bearing means in said support and supporting a shaft with its upper end positioned centrally in said cavity, the coupling driven member being fixed on said shaft within said cavity, the outer annular portion of said bearing support being received and guided in said skirt and coacting with said diaphragm wall as a stop to position said driven member for rotation on an axis substantially co-axial with said motor shaft in field coupled relation with the driving member, and said bearing support forming with said diaphragm wall an enclosure for said driven member, a pump rotor on said shaft beyond said bearing means, a pump casing positioned from said bearing support and forming a pump chamber about said pump rotor, and inlet and outlet means for the pump.

7. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a casing sealingly enclosing said drive assembly and having the imperforate diaphragm wall as an end wall thereof lying normal to the axis of rotation of said driving member and in field-transmitting relation therewith, a tubular skirt projecting beyond said end wall, a bearing support having an outer annular portion and a web portion forming an upwardly open cavity, shaft bearing means carried by said support and supporting a driven shaft centrally of said cavity, the magnetic-coupling driven member being fixed on the upper end of said shaft for rotation in said cavity, the outer annular portion of said bearing support being received and guided in said tubular skirt and coacting with said end wall as a stop, thereby positioning said driven member in field coupled relation with the driving member, a pump rotor on said driven shaft below said bearing means, a pump casing positioned from said bearing support and forming a pump chamber about said rotor, and inlet and outlet means for the pump.

8. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a casing sealingly enclosing said drive assembly and having the imperforate diaphragm wall as an end wall thereof lying normal to the axis of rotation of said driving member and in field-transmitting relation therewith, a tubular skirt projecting beyond said end wall, a bearing support having an outer annular portion and a web portion forming an upwardly open cavity, shaft bearing means carried by said support and supporting a driven shaft centrally of said cavity, the magnetic-coupling driven member being fixed on the upper end of said shaft for rotation in said cavity, the outer annular portion of said bearing support being received and guided in said tubular skirt and coacting with said end wall as a stop, thereby positioning said driven member in field coupled relation with the driving member, a pump rotor on said driven shaft below said bearing means, a pump casing having locating means received in said tubular skirt in abutting relation with said annular portion of said bearing support and having chamber-forming means about said pump rotor, inlet and outlet means for the pump, said skirt being mechanically secured to said pump casing means to retain the same and said bearing support in assembled relation with each other and with the driving assembly.

9. A submersible motor-pump unit having a drive assembly including a motor and a magnetic-coupling driving member operatively connected to the motor shaft thereof, and having a driven assembly including a magnetic-coupling driven member and a pump connected thereto, said coupling members being magnetically coupled through an imperforate diaphragm wall, said unit comprising a casing sealingly enclosing said drive assembly and having the imperforate diaphragm wall as an end wall thereof lying normal to the axis of rotation of said driving member and in field-transmitting relation therewith, a tubular skirt projecting beyond said end wall, a bearing support having an outer annular portion of downwardly open channel configuration with a web portion joined to the inner wall thereof and forming therewith an upwardly open cavity, shaft bearing means carried by said web, a driven shaft in said bearing means, said driven coupling member being fixed on said shaft for rotation in said cavity, a pump rotor on said shaft below said bearing means, a pump casing having locating means received in said downwardly open channel, inlet and outlet means for the pump, said channel being received and guided in said tubular skirt and thereby positioning said bearing support and driven member in operative relation with said driving assembly, said skirt being mechanically secured to said pump casing to retain the same and said bearing support in assembled relation with each other and with the driving assembly.

10. A drive assembly adapted for a submersible motor-pump unit, comprising a housing tube, a cup-shaped member sealingly fixed in said tube with its web forming an imperforate diaphragm wall as a transverse end wall for said housing tube and with its sides forming shoulder means in predetermined positional relationship with said diaphragm wall, a motor mount centered in said tube engaging and positioned by said shoulder means in predetermined relation to said diaphragm wall, a motor mounted on said mount and having a shaft carrying a magnetic-coupling driving member rotatable on an axis normal to said diaphragm wall and with said driving member in magnetic field-transmitting relation with said diaphragm wall, hold-down means for retaining said motor mount in mounted position against said shoulder means, and a closure for the end of said housing tube, said closure retaining said hold-down means in operative position and sealingly closing the housing tube, whereby said motor and driving member are sealingly enclosed and fixed in said housing means in predetermined relation to said diaphragm wall, said tube extending beyond said diaphragm wall and forming therewith a downwardly open receptacle for receiving and guiding a driven assembly in operative relation with said drive assembly.

11. A driven assembly adapted for a submersible motor-pump unit, comprising a bearing support having an outer annular portion of downwardly open channel configuration providing upper and outer locating faces, a web portion joined to the inner wall of said annular channel and forming therewith an upwardly open cavity, shaft bearing means carried by said web and supporting a shaft centrally of said cavity, a magnetic-coupling driven member fixed on said shaft for rotation in said cavity, a pump rotor on said shaft below said bearing means, a pump casing about said rotor and forming an upper inlet eye about said shaft, locating means for said casing received in said downwardly open channel and coacting therewith to locate said casing in operating relationship with respect to the bearing support, and outlet means for said pump.

References Cited in the file of this patent

UNITED STATES PATENTS

| | | |
|---|---|---|
| 593,571 | Fay | Nov. 16, 1897 |
| 2,366,562 | Schug | Jan. 2, 1945 |
| 2,506,886 | Okulitch | May 9, 1950 |
| 2,569,741 | Arutunoff | Oct. 2, 1951 |
| 2,638,558 | Rankin | May 12, 1953 |
| 2,779,513 | Dickey | Jan. 29, 1957 |